US012649365B2

(12) United States Patent
Berinde et al.

(10) Patent No.: US 12,649,365 B2
(45) Date of Patent: Jun. 9, 2026

(54) CIRCUIT ARRANGEMENT FOR DISCHARGING AT LEAST ONE ENERGY ACCUMULATOR CHARGED TO A HIGH VOLTAGE

(71) Applicant: Vitesco Technologies GmbH, Regensburg (DE)

(72) Inventors: Florin-Constantin Berinde, Munich (DE); Septimiu Lica, Munich (DE); Aurelian Kotlar, Munich (DE)

(73) Assignee: Vitesco Technologies GmbH, Hannover (DE)

( * ) Notice: Subject to any disclaimer, the term of this patent is extended or adjusted under 35 U.S.C. 154(b) by 818 days.

(21) Appl. No.: 17/635,084

(22) PCT Filed: Aug. 13, 2020

(86) PCT No.: PCT/EP2020/072704
§ 371 (c)(1),
(2) Date: Feb. 14, 2022

(87) PCT Pub. No.: WO2021/028516
PCT Pub. Date: Feb. 18, 2021

(65) Prior Publication Data
US 2022/0289031 A1 Sep. 15, 2022

(30) Foreign Application Priority Data

Aug. 14, 2019  (EP) .................................... 19465544
Aug. 19, 2019  (DE) ..................... 10 2019 212 377.5

(51) Int. Cl.
*H02M 1/32* (2007.01)
*B60L 3/00* (2019.01)
(Continued)

(52) U.S. Cl.
CPC ............. *B60L 3/0046* (2013.01); *B60L 53/20* (2019.02); *B60L 58/10* (2019.02); *H02M 1/322* (2021.05);
(Continued)

(58) Field of Classification Search
CPC ...................................................... H02M 1/322
(Continued)

(56) References Cited

U.S. PATENT DOCUMENTS 5,486,201 A    1/1996  Canfield
5,523,665 A    6/1996  Deaver
(Continued)

FOREIGN PATENT DOCUMENTS

CN        102195503 A      9/2011
CN        103227469 A      7/2013
(Continued)

*Primary Examiner* — Ahmed H Omar
(74) *Attorney, Agent, or Firm* — Laurence A. Greenberg; Werner H. Stemer; Ralph E. Locher

(57) ABSTRACT

A circuit arrangement discharges at least one energy store charged to a high voltage in a motor vehicle. The circuit arrangement includes a discharge circuit which is connected in parallel with the energy store and contains an auxiliary microcontroller for actuating the discharge circuit. The auxiliary microcontroller can be operated with a low voltage of 3-5 volts and contains a first voltage supply circuit for supplying the auxiliary microcontroller with the low voltage of 3-5 volts, which first voltage supply circuit is fed from a buffer capacitor with a voltage of 10-15 volts. The circuit arrangement further contains a main microcontroller, which is configured to actuate the auxiliary microcontroller so that the latter actuates the discharge circuit.

9 Claims, 2 Drawing Sheets

(51) Int. Cl.
    *B60L 53/20*     (2019.01)
    *B60L 58/10*     (2019.01)

(52) U.S. Cl.
    CPC ......... *B60L 3/0007* (2013.01); *B60L 2210/10* (2013.01); *H02J 2207/20* (2020.01)

(58) Field of Classification Search
    USPC .......................................................... 320/166
    See application file for complete search history.

(56) References Cited

U.S. PATENT DOCUMENTS

| | | | |
|---|---|---|---|
| 8,289,004 B2 | 10/2012 | Hung et al. | |
| 8,791,681 B2 | 7/2014 | Akaishi et al. | |
| 9,018,865 B2 | 4/2015 | Meyer et al. | |
| 9,381,819 B2 | 7/2016 | Wu et al. | |
| 9,470,739 B2 | 10/2016 | Govindaraj et al. | |
| 9,637,009 B2 | 5/2017 | Sugiura | |
| 10,035,422 B2 | 7/2018 | Zhou et al. | |
| 10,615,682 B2 | 4/2020 | Nakamura et al. | |
| 10,737,681 B2 | 8/2020 | Ono | |
| 2008/0278117 A1 | 11/2008 | Tarchinski | |
| 2011/0031939 A1* | 2/2011 | Funaba | H02J 9/002 |
| | | | 320/166 |
| 2012/0008354 A1 | 1/2012 | Tang | |
| 2013/0181686 A1 | 7/2013 | Ueda | |
| 2013/0207458 A1 | 8/2013 | Viancino et al. | |
| 2015/0097501 A1* | 4/2015 | Yamane | B60L 1/00 |
| | | | 318/400.3 |
| 2015/0102691 A1 | 4/2015 | Kollreutter | |
| 2016/0097799 A1 | 4/2016 | Rocher | |
| 2017/0017249 A1 | 1/2017 | Jezik et al. | |
| 2017/0050524 A1 | 2/2017 | Mai | |
| 2017/0166075 A1 | 6/2017 | Hong et al. | |
| 2017/0294791 A1* | 10/2017 | Mito | H02M 7/537 |
| 2017/0361712 A1* | 12/2017 | Terao | B60K 6/445 |
| 2018/0079315 A1 | 3/2018 | Yang et al. | |
| 2018/0331616 A1* | 11/2018 | Hirakata | H03K 17/687 |
| 2019/0173395 A1 | 6/2019 | Huettinger et al. | |
| 2019/0379220 A1* | 12/2019 | Ueda | H02J 7/0031 |

FOREIGN PATENT DOCUMENTS

| | | | | |
|---|---|---|---|---|
| CN | 104626995 A | 5/2015 | | |
| CN | 106357101 A | 1/2017 | | |
| CN | 106655372 A | 5/2017 | | |
| CN | 106787657 A | 5/2017 | | |
| CN | 106849043 A | 6/2017 | | |
| CN | 107046362 A | 8/2017 | | |
| CN | 107508528 A | 12/2017 | | |
| CN | 107623478 A | 1/2018 | | |
| CN | 108028612 A | 5/2018 | | |
| CN | 108282081 A | 7/2018 | | |
| CN | 106347170 B | 9/2018 | | |
| CN | 108809067 A | 11/2018 | | |
| DE | 102012203071 A1 | 8/2013 | | |
| DE | 102016222632 A1 | 5/2018 | | |
| JP | 2013182856 A | * | 9/2013 | ............ H05B 47/10 |
| JP | 5903673 B2 | * | 4/2016 | ............ H05B 47/10 |
| KR | 20160134206 A | 11/2016 | | |

\* cited by examiner

CIRCUIT ARRANGEMENT FOR DISCHARGING AT LEAST ONE ENERGY ACCUMULATOR CHARGED TO A HIGH VOLTAGE

FIELD AND BACKGROUND OF THE INVENTION

The invention relates to a circuit arrangement for discharging at least one energy store charged to a high voltage in a motor vehicle, comprising a discharge circuit, which is connected in parallel with the energy store.

Such a circuit arrangement is known from DE 10 2016 222 632 A1. In said document, before the energy store charged to a high voltage is discharged, a brief test discharge is first carried out using a timer and, in the process, a voltage drop detector or a rate detector is used to check whether the energy store, which in this case is a DC-link capacitor, is isolated from the high-voltage battery and can thus be discharged without the risk of an excessive flow of current from the high-voltage battery. Only then is discharging carried out, in a manner controlled by the voltage drop detector. The timer and the voltage drop detector can be implemented in a microcontroller, wherein the microcontroller can be supplied with power using a buffer capacitor, which is charged from the energy store via a linear regulator.

In electric or hybrid electric vehicles, high-power lines, to which a high DC voltage having values of several hundred volts can be applied, are used to transport electrical energy from a high-voltage battery to the electric traction motor or from the charger to the high-voltage battery. Energy stores, usually in the form of DC-link capacitors, are connected to these high-power or high-voltage lines in order to smooth current spikes or provide for temporary increased energy delivery, said energy stores then also being charged to the high voltage.

The high-voltage battery is usually connected to the electrical circuits and the high-voltage line via switches, often referred to as contactors, the energy stores being connected to the high-voltage line on the side of the electrical circuits.

If the vehicle is stationary for a relatively long time or an inspection or repair is carried out, or in the case of an accident, the one or more energy stores must be discharged at least to below the contact voltage of 60 volts, so that people are not endangered by the high voltage.

The U.S. Federal Motor Vehicle Safety Standards (FMVSS) require capacitors on the high-voltage lines to be discharged to below 60 volts within 5 seconds in certain situations.

However, discharge circuits need a voltage supply, which may, however, be interrupted if the vehicle is involved in an accident, for example because the cables of the 12-volt vehicle battery have been torn off. Using the high voltage for the voltage supply leads to complex insulation requirements when designing the discharge circuit and requires high-voltage-resistant and therefore expensive components.

SUMMARY OF THE INVENTION

It is therefore the object of the invention to specify a circuit arrangement for discharging at least one energy store charged to a high voltage in a motor vehicle, which circuit arrangement can be implemented in the low-voltage region and nevertheless has an accident-proof voltage supply.

The object is achieved by a circuit arrangement as claimed in the independent claim. Advantageous developments are specified in the dependent claims.

Accordingly, a circuit arrangement according to the invention for discharging at least one energy store charged to a high voltage in a motor vehicle is formed with a discharge circuit, which is connected in parallel with the energy store, with an auxiliary microcontroller for actuating the discharge circuit, which auxiliary microcontroller can be operated with a low voltage of 3-5 volts, with a first voltage supply circuit for supplying the auxiliary microcontroller with the low voltage of 3-5 volts, which first voltage supply circuit is fed from a buffer capacitor with a voltage of 10-15 volts, and with a main microcontroller, which is designed to actuate the auxiliary microcontroller so that the latter actuates the discharge circuit.

Using an auxiliary microcontroller, which can be supplied with a low voltage of 3-5 volts provided by the first voltage supply circuit, allows a relatively small buffer capacitor to be used for supplying power to the first voltage supply circuit, wherein the discharge circuit can nevertheless be kept in operation for a required time of 5 seconds, which is sufficient for discharging the energy stores, even if the actual voltage supply, namely the 12-volt vehicle battery, is no longer connected.

In a first embodiment, the discharge circuit is formed with a discharge resistor and a discharge transistor connected in series with said discharge resistor, the auxiliary microcontroller being connected to the discharge circuit via a driver circuit.

This is a very safe way of carrying out the discharging, since the electrical energy stored in the energy store is converted into heat energy only by means of a discharge resistor, which is connected in parallel with the energy store by way of a discharge transistor, which is connected in series with said discharge resistor, and this conversion can usually take place without any problems and without constraints.

In an alternative, second embodiment, the discharge circuit is formed with a DC-to-DC converter, which is connected, on the output side, to a high-voltage battery and is connected to an actuating control circuit, which is connected to the auxiliary microcontroller.

This makes it possible, in an advantageous manner, not merely to convert the electrical energy stored in the energy store into heat, but to store it back again in the high-voltage battery.

However, since in certain circumstances conditions may prevail in which sufficiently quick discharging by recuperation is impossible, the discharge circuit can advantageously furthermore be formed with a discharge resistor and a discharge transistor connected in series with said discharge resistor, said discharge resistor and discharge transistor being connected in parallel with the DC-to-DC converter.

As a result, safe discharging can be carried out in any event, although without recovering the energy.

In order to charge the buffer capacitor for supplying power to the auxiliary microcontroller, said buffer capacitor can advantageously be connected to a second voltage supply circuit, which is connected, for operation, to the continuous positive voltage terminal (known as terminal 30) in the electrical on-board power supply network of the motor vehicle.

As a result, the buffer capacitor is charged from the electrical on-board power supply network of the motor vehicle, wherein if cables are intact even after an accident, the auxiliary microcontroller can also be supplied with power directly from the on-board power supply network.

In one development of the circuit arrangement, the high potential of the high voltage is connected to a monitoring circuit, which is connected to the auxiliary microcontroller and, via an electrically decoupled line, to the main microcontroller.

This allows the discharge current to be monitored both by the auxiliary microcontroller and by the main microcontroller.

In one advantageous configuration of the circuit arrangement, the actuation line between the main microcontroller and the auxiliary microcontroller is also electrically decoupled. In one configuration, optocouplers are used for this purpose.

This allows good decoupling between the low-voltage region, in which the main microcontroller has to perform further tasks, and the high-voltage region, with which the auxiliary microcontroller is connected, to be achieved.

In one advantageous development, the discharge circuit can be formed with a further DC-to-DC converter, which is connected, on the output side, to a low-voltage battery (the terminal 30) and is connected to a further actuating control circuit, which is connected to the auxiliary microcontroller.

The energy stored in the energy store can thus be recuperated not only in the high-voltage battery but also in the low-voltage battery.

In one advantageous configuration of the circuit arrangement, the discharge transistor is an IGBT (insulated-gate bipolar transistor), which is connected to an actuating driver circuit, which is connected to the second voltage supply circuit.

The invention will be explained in more detail below on the basis of exemplary embodiments and with the aid of figures.

DETAILED DESCRIPTION OF THE INVENTION

Figure 1:
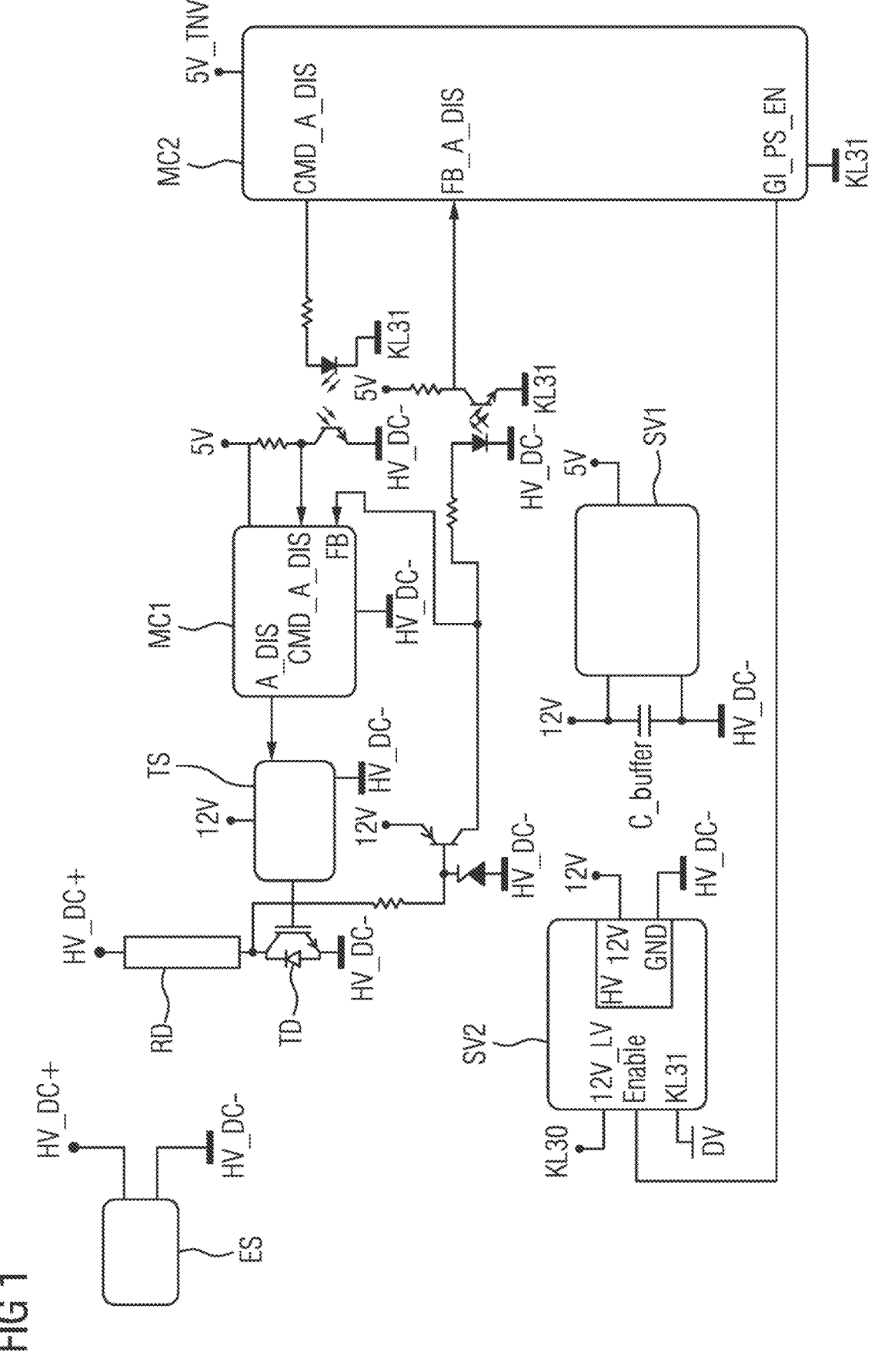
FIG. 1 shows a first exemplary embodiment of the circuit arrangement comprising a discharge circuit, which comprises a discharge resistor and a discharge transistor connected in series with said discharge resistor.

FIG. 1 schematically shows an energy store ES, which is connected between two high-voltage lines that have a high potential HV_DC+ and a low potential HV_DC−, respectively. The energy store ES can be formed with one or a plurality of capacitors, which serve either as smoothing capacitors for current and voltage spikes or, if necessary, to enable a higher load current for supporting the high-voltage battery to which said capacitors are connected via circuit breakers (not shown).

In order to discharge the energy store ES, in the illustrated exemplary embodiment of FIG. 1, the series circuit consisting of a discharge resistor RD and a discharge transistor TD, which is in the form of an IGBT (insulated-gate bipolar transistor) with a substrate diode in the illustrated exemplary embodiment, is connected in parallel with said energy store. The discharge transistor TD is actuated by a driver circuit TS, which is supplied with power from a 12-volt source, for example, on one side and is connected to the low potential HV_DC− on the other side. The driver circuit TS is in turn actuated by an auxiliary microcontroller MC1, which in turn is actuated by a main microcontroller MC2 in order to cause the energy store ES to be discharged.

In the illustrated exemplary embodiment, the auxiliary microcontroller MC1 is supplied with a low voltage value of 5 volts from a voltage supply, and the reference potential connection thereof is also at the low potential HV_DC− of the high-voltage line, since it is electrically connected to the high-voltage part. The actuation of the auxiliary microcontroller MC1 by the main microcontroller MC2 takes place via an optocoupler and is therefore electrically decoupled in order to isolate the main microcontroller MC2 from the high-voltage part of the circuit arrangement. The voltage level at the connection point of the discharge transistor TD to the discharge resistor RD is fed directly to the auxiliary microcontroller MC1 via a monitoring circuit and also fed to the main microcontroller MC2 via an electrically decoupled optocoupler in order to be able to monitor the switching on and off of the discharge transistor TD.

In accordance with the invention, the supply voltage of 5 volts for the auxiliary microcontroller MC1 is provided by a first voltage supply circuit SV1, which in turn is supplied with a voltage of 12 volts by a second voltage supply circuit SV2, which is supported in accordance with the invention by means of a buffer capacitor C_buffer in order to be able to provide the required 5 seconds of the supply voltage for the auxiliary microcontroller MC1.

The second voltage supply circuit SV2 is in turn supplied with power by the 12-volt vehicle battery and is connected to the positive pole thereof, which is known as the continuous positive KL30 and is referred to as terminal 30. In terms of reference potential, said second voltage supply circuit is connected to the negative pole KL31 of the vehicle battery, which is referred to as terminal 31. The reference potential of the first voltage supply circuit SV1 and also of the buffer capacitor C_buffer is the low potential HV_DC− of the high-voltage line, as a result of which the second voltage supply circuit SV2 is required to be electrically isolated internally.

Thus, in the event that the battery cable is torn off and there is therefore no longer any voltage at terminal 30 (KL30), the inventive configuration of the circuit arrangement of FIG. 1 allows the auxiliary microcontroller MC1 to continue to be supplied with power via the first voltage supply circuit SV1, at least for a predetermined amount of time, since the buffer capacitor C_buffer is dimensioned so as to be large enough to provide the energy required therefor.

Figure 2:
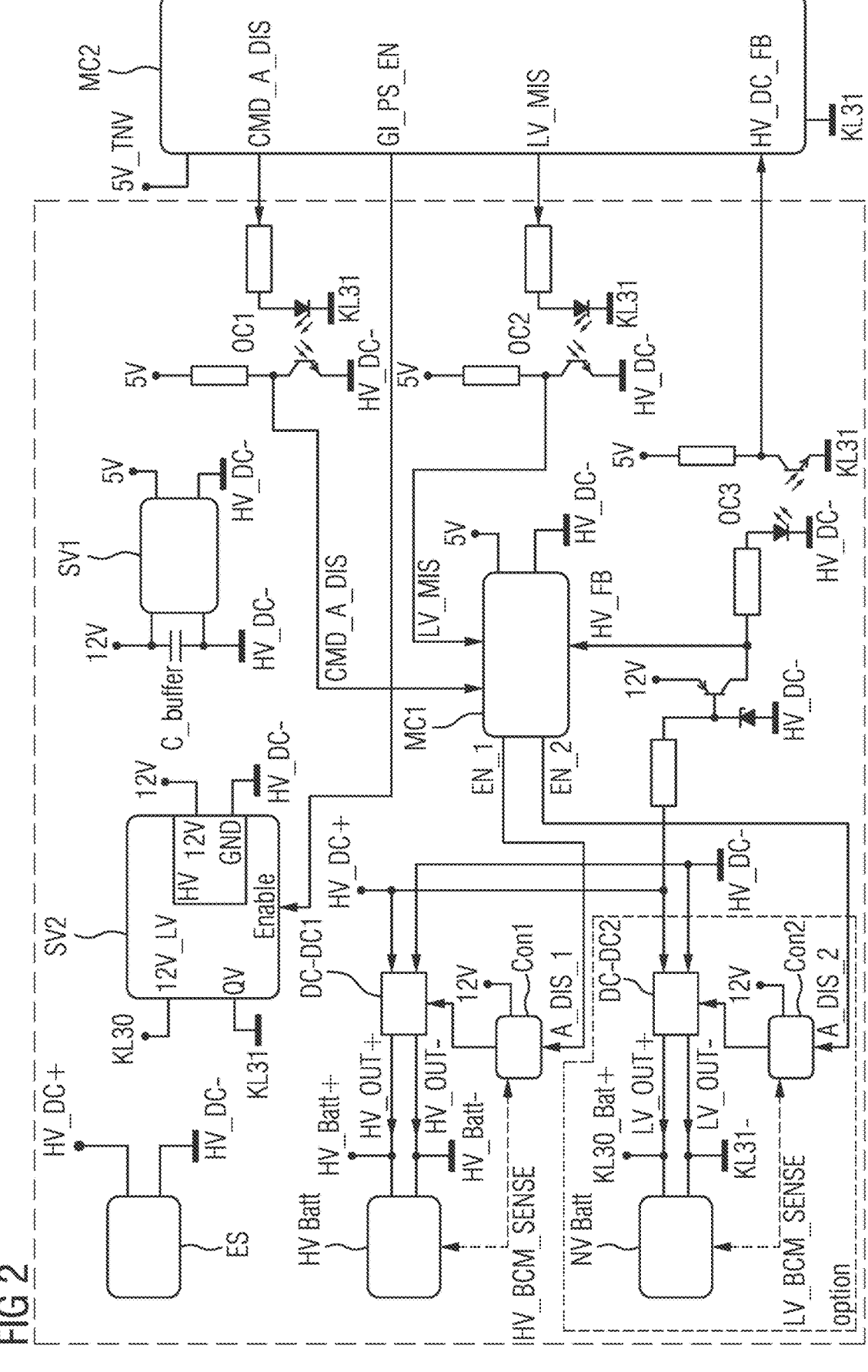
FIG. 2 shows a second exemplary embodiment of the circuit arrangement comprising a DC-to-DC converter, which is connected, on the output side, to a high-voltage battery.

FIG. 2 shows a further exemplary embodiment of a circuit arrangement according to the invention, in which the same circuit components are provided with the same reference signs.

Here, in contrast to the embodiment in FIG. 1, an energy store ES, which is arranged between the high-voltage line potentials HV_DC+ and HV_DC−, is discharged, if necessary, in a manner controlled by the auxiliary microcontroller MC1 and the main microcontroller MC2 via a DC-to-DC converter DC-DC1, but the energy stored in the energy store ES is advantageously stored back again in the high-voltage battery HVBatt.

In this case, the DC-to-DC converter DC-DC1 is controlled in a known manner by a control circuit Con1, the control circuit Con1 being actuated by the auxiliary microcontroller MC1 using an actuation signal EN_1.

In a development of an alternative circuit arrangement of this kind, FIG. 2 also indicates that a further DC-to-DC converter DC-DC2, via which the energy store ES can be discharged into the low-voltage battery NVBatt (which is the usual 12-volt vehicle battery), can be provided.

In this case, the further DC-to-DC converter DC-DC2 is controlled by a further control circuit Con2, which in turn is actuated by the auxiliary microcontroller MC1 using a further actuation signal EN_2.

Both the high-voltage battery HVbatt and the low-voltage battery NVbatt can be connected by the control circuit Con1 and the further control circuit Con2, respectively, via corresponding connections HV_BCN_Sense and LV_BCN_Sense, respectively, in order to make the state of charge of the batteries accessible to the control circuits Con1, Con2 so as to allow discharging into the respective batteries to be controlled on the basis thereof.

FIG. 2 does not show a development of the circuit arrangement therein by adding a discharge circuit according to FIG. 1, namely the series circuit consisting of a discharge resistor and a discharge transistor, in order to be able to cause the energy store ES to be discharged in any event, if the batteries are unable to be used as recuperative storage means.

The invention claimed is:

1. A circuit configuration for discharging at least one energy store charged to a high voltage in a motor vehicle, the circuit configuration comprising:

a discharge circuit connected in parallel with the at least one energy store;

an auxiliary microcontroller for actuating said discharge circuit, said auxiliary microcontroller being operated with a low voltage of 3-5 volts;

a buffer capacitor;

a first voltage supply circuit for supplying said auxiliary microcontroller with the low voltage of 3-5 volts, said first voltage supply circuit being fed from said buffer capacitor with a voltage of 10-15 volts;

a main microcontroller configured to actuate said auxiliary microcontroller so that said auxiliary microcontroller actuates said discharge circuit;

a second voltage supply circuit, said buffer capacitor being connected, for charging, to said second voltage supply circuit, said second voltage supply circuit being connected to and supplied with power by a continuous positive voltage terminal of a vehicle battery in an electrical on-board power supply network of the motor vehicle; and said auxiliary microcontroller being directly supplied with a voltage only by said first voltage supply circuit.

2. The circuit configuration according to claim 1, wherein said discharge circuit has a discharge resistor and a discharge transistor connected in series with said discharge resistor; and further comprising a driver circuit, said auxiliary microcontroller being connected to said discharge circuit via said driver circuit.

3. The circuit configuration according to claim 1, further comprising an actuating control circuit;

further comprising a high-voltage battery; and wherein said discharge circuit has a DC-to-DC converter, said DC-to-DC converter is connected, on an output side, to said high-voltage battery and is connected to said actuating control circuit, which is connected to said auxiliary microcontroller.

4. The circuit configuration according to claim 3, wherein said discharge circuit further has a discharge resistor and a discharge transistor connected in series with said discharge resistor, said discharge resistor and discharge transistor are connected in parallel with said DC-to-DC converter.

5. The circuit configuration according to claim 1, further comprising:

an electrically decoupled line; and a monitoring circuit, a high potential of a high voltage is connected to said monitoring circuit, which is connected to said auxiliary microcontroller and, via said electrically decoupled line, to said main microcontroller.

6. The circuit configuration according to claim 1, further comprising an actuation line connected between said main microcontroller and said auxiliary microcontroller, said actuation line being electrically decoupled.

7. The circuit configuration according to claim 3, further comprising a further actuating control circuit;

further comprising a low-voltage battery; and wherein said discharge circuit has a further DC-to-DC converter, which is connected, on an output side, to said low-voltage battery and is connected to said further actuating control circuit, said further actuating control circuit is connected to said auxiliary microcontroller.

8. The circuit configuration according to claim 1, wherein said discharge transistor is an insulated-gate bipolar transistor, which is connected to said driver circuit, which is connected to said second voltage supply circuit.

9. The circuit configuration according to claim 5, wherein said electrically decoupled line is one of a plurality of electrically decoupled lines being formed with optocouplers.

* * * * *